United States Patent [19]
Gautheron et al.

[11] Patent Number: 5,288,059
[45] Date of Patent: Feb. 22, 1994

[54] ELASTIC JOINT HAVING HIGH FILTERING CAPACITY AND AN AXIAL GAP CONTROLLED BY INCORPORATED STOPS, AND ITS APPLICATIONS

[75] Inventors: Michel Gautheron, Nevers; Thierry Duchene, Verriere Le Buisson, both of France

[73] Assignee: Caoutchouc Manufacture et Plastiques, Versailles Cedex, France

[21] Appl. No.: 916,507

[22] Filed: Jul. 20, 1992

[30] Foreign Application Priority Data

Jul. 22, 1991 [FR] France ............ 91 09328

[51] Int. Cl.$^5$ ............ F16F 1/38; B60G 7/02
[52] U.S. Cl. ............ 267/292; 267/141.2; 267/281
[58] Field of Search ............ 267/292, 140.12, 140.3, 267/140.5, 152, 153, 281, 276, 141.2–141.5; 280/717; 403/225, 226, 227, 228

[56] References Cited

U.S. PATENT DOCUMENTS

| | | | |
|---|---|---|---|
| 1,948,476 | 2/1934 | Saurer | 267/292 X |
| 1,983,796 | 12/1934 | Geyer | 287/85 |
| 3,762,734 | 10/1973 | Vogel | 267/153 X |
| 4,316,643 | 2/1982 | Burk et al. | 267/141.2 X |
| 4,671,694 | 6/1987 | Brenner et al. | 403/226 |
| 4,720,120 | 1/1988 | Shimatani et al. | 267/292 X |
| 5,024,425 | 6/1991 | Schwerdt | 267/141.2 |

FOREIGN PATENT DOCUMENTS

| | | | |
|---|---|---|---|
| 0162745 | 11/1985 | European Pat. Off. | |
| 0312448 | 4/1989 | European Pat. Off. | 267/292 |
| 0373389 | 6/1990 | European Pat. Off. | 267/292 |
| 0384799 | 8/1990 | European Pat. Off. | 267/292 |
| 733768 | 3/1943 | Fed. Rep. of Germany | 267/141.5 |
| 827020 | 4/1938 | France | |
| 957174 | 2/1950 | France | |
| 1415871 | 9/1965 | France | |
| 2430538 | 2/1980 | France | |
| 2650040 | 1/1991 | France | |
| 0093533 | 5/1984 | Japan | 267/153 |
| 0020132 | 1/1991 | Japan | 267/153 |
| 637901 | 5/1950 | United Kingdom | |
| 653982 | 5/1951 | United Kingdom | |

Primary Examiner—Robert J. Oberleitner
Assistant Examiner—Peter M. Poon
Attorney, Agent, or Firm—Thomas N. Ljungman

[57] ABSTRACT

An elastic joint with high filtering capacity and axial gap controlled by incorporated stops includes an elastic ring disposed between internal and external coaxial rigid elements, with an additional elastomer layer disposed at each end of the joint between an axial shoulder of the internal armature casing and a turned in edge of the external ring. Thus, a stop function in an axial direction, which stop function is due to the interaction of the shoulder, the turned in edge, and the elastomer disposed therebetween, produces a filtering rigidity from two to five times lower than the radial rigidity in an equilibrium position, which axial rigidity becomes progressively higher than the radial rigidity beyond the filtering zone when a significant axial force is applied to the joint. Such a joint can be used for motor vehicle suspension arms and in antivibration insulation of mobile or stationary equipment.

20 Claims, 3 Drawing Sheets

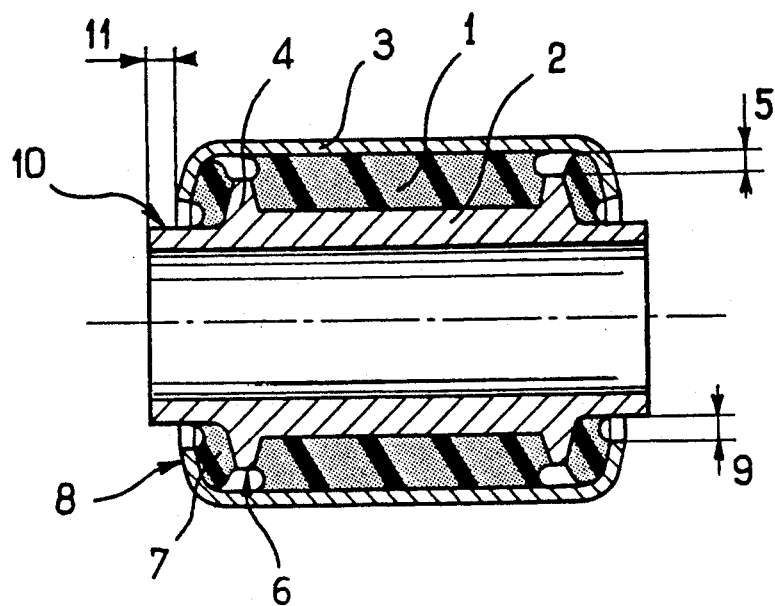
FIG_1
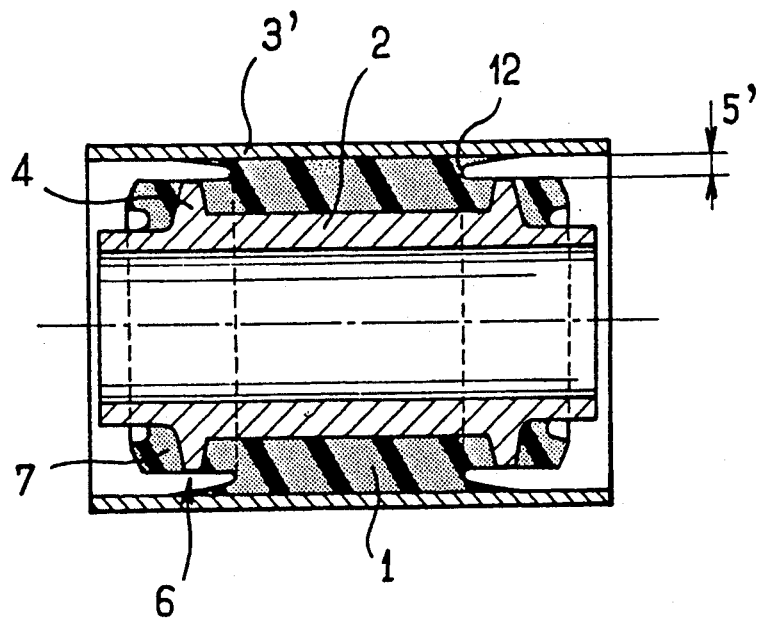
FIG_3

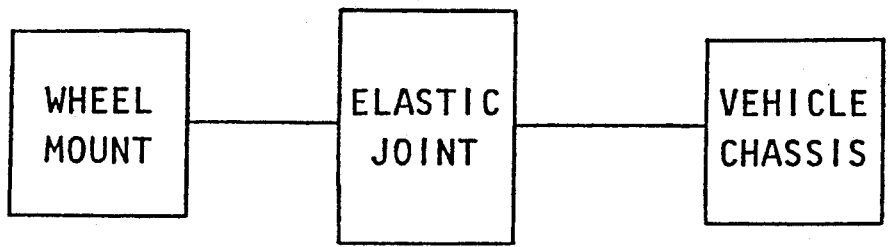
FIG_4
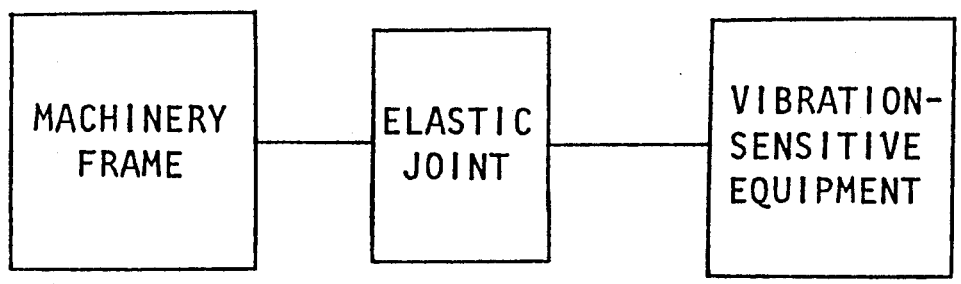
FIG_5

ELASTIC JOINT HAVING HIGH FILTERING CAPACITY AND AN AXIAL GAP CONTROLLED BY INCORPORATED STOPS, AND ITS APPLICATIONS

BACKGROUND OF THE INVENTION

1. Field of the Invention

This invention relates to the field of elastic couplings, or joints which utilize an elastomer link between two rigid, coaxial elements, making possible their relative rotation, without friction, around an axis on which significant radial loads and axial forces can be exerted, while ensuring controlled filtering rigidities by means of a joint which is easy to manufacture. The invention relates, in particular, to the articulation of suspension arms for motor vehicles, as well as to the antivibration suspension of sensitive mobile or stationary equipment.

2. Description of the Prior Art

The articulation, by rotation of an arm, e.g. a suspension arm, on a flange fixed to the chassis of a vehicle, usually makes use of the deformation of an elastomer based elastic block.

The refinements of conventional elastic couplings, such as those described in Great Britain Patent No. 637,901 to Silentbloc, French Patent No. 957,174 and French Patent No. 1.415.871 to Metalastik have become inadequate in relation to current industrial requirements, particularly in relation to the requirements of the automobile industry. They were first concerned with improving the capabilities for angular movement, without play, by introducing the ability to slide beyond a certain friction limit. French Patent No. 2,430,538 to SAGA, for a swivel bearing and European Patent No. 0,163,980 (equivalent to U.S. Pat. No. 4,671,694) to Boge and TRW-Ehrenreich for a quasi-cylindrical sleeve, disclose the use of axial prestressing of the elastic portion of the sleeve by conical deformation of the extremities of the external tubular ring, which extremi7 ties are folded toward the inside of the ring. As a result of this prestress, the angular movement must exceed a certain threshold to utilize the functional sliding of the joint. The latter two documents discussed above also disclose articulations wherein a major axial force can be exerted, without the possibility of play, but which always show a high rigidity connection, which connection cannot then claim to provide good antivibration filtering.

On the other hand, French Patent No. 827,020 to Metalastik discloses the possibility of axial play with good filtering by means of the use of a layer of rubber located exterior to the external armature. This layer of rubber thereby acts as a stop to ensure reaction to axial forces after the closing of a gap, thereby not permitting the simultaneous filtering and opposition to axial forces.

For radial filtering, refinements running in another direction improve the filtering by reducing the radial rigidity over a short stroke limited by the activation of a stop, to a position which is as close as possible to the functional position.

European Patent No. 0,162,745 to Hutch discloses the utilization of grooves worked into the exposed lateral surface of the elastic material. These grooves close to ensure a stop function by mechanical contact between their walls, and also to allow for major radial forces to be exerted beyond the filtering zone made possible by the short stroke. Axial forces may not be applied to this type of part in particular, and in addition, the "conical" orientation, i.e. an angular difference between the coaxial elements, modifies the value of the functional play by restricting it to the point where it is eliminated altogether beyond a certain angle.

An improvement of this device is disclosed in French Patent No. 2,650,040 to Caoutchouc Manufacturé et Plastiques, the present applicant. This patent describes an elastic joint having a significant radial filtering capability and gradual stroke limitation, by contact with a large cell surface, worked into a cylindrical housing, while maintaining an axial prestress between the adherized conical washers. The high form factor, which is favorable on account of the adherization of the washers, makes it possible to use a significant quantity of resilient material, which thereby retains its filtering capabilities, while also retaining the ability to accept large forces in the axial direction.

This arrangement retains the capabilities of so-called "conical" angular movement between the axes of the components. But these latter two applications, which are quite different, do not have as their primary objective a good axial filtering which is compatible with occasional, but large, axial forces.

Apparently, a requirement for axial filtering, while retaining the capability of bearing large axial forces, is not satisfied in the devices of the prior art except by separating the functions, which separate functions require the user to separately adjust the effective filtering and to limit the stroke by means of additional appropriate stops.

OBJECT OF THE INVENTION

The object of the invention is to apply a simple and economic remedy, by integrating these functions into a single elastic articulation, manufactured by means which are conventional in the rubber transformation industry, without adversely affecting the performance required by the user.

SUMMARY OF THE INVENTION

This object can be met in a coupling according to the present invention, in which the coupling has a high filtering capability and a controlled gap, or play, as a result of the incorporation of stops. The device takes advantage of the elastic connection of an elastomer compound intimately bonded to two coaxial rigid elements to thereby allow the frictionless rotation of a suspension arm around a fixed axis.

The invention is characterized by the fact that a layer of significant thickness, which layer is preferably made of elastomer compound and covers the effectively axial shoulders of each end of an internal armature casing, is in axial contact in each direction with the hammered-in edge of an external radially hammered ring which external ring swivels, or pivots about, by deformation of an elastic ring on an internal armature casing. The stop function, in each axial direction, is optimized to obtain, during dynamic movements without permanent axial stresses, a filtering rigidity from two to five times lower than the rigidity opposing the radial forces. In addition, the axial rigidity beyond the filtering zone becomes progressively greater than the value of the rigidity opposing the radial forces.

In summary, one aspect of the invention resides broadly in an elastic coupling for joining together and filtering vibrations between a first component and a second component, the coupling comprising: a substantially rigid inner member for being attached to one of the first and the second components, the inner member having a first end, a second end, a longitudinal axis extending from the first end to the second end, and an outer surface disposed about the inner member; a substantially rigid outer member for being attached to the other of the first and second components, the outer member for being disposed about at least a portion of the inner member, the outer member having an inner surface for being disposed a distance from the outer surface of the inner member; at least one first projection disposed adjacent at least one of the first and the second ends of the inner member and extending radially outwardly from the inner member a portion of the distance between the inner member and the outer member; elastomeric device for being disposed between the inner member and the outer member to filter vibrations, the elastomeric device having a first portion and a second portion, the first portion comprising a first elastomeric portion disposed on the inner member in an area between the at least one first projection and the other of the first and the second ends of the inner member, the first elastomeric portion being disposed between the inner and the outer member in contact with the outer surface of the inner member and the inner surface of the outer member; at least one second projection disposed on the outer member substantially adjacent one of the at least one first projection of the inner member, the at least one second projection extending radially inwardly from the outer member a portion of the distance between the inner member and the outer member; and the second portion comprising at least one second elastomeric portion disposed between each of the at least one first projection and the adjacent at least one second projection.

Another aspect of the invention resides broadly in an anti7vibration suspension for wheels of a motor vehicle, said suspension comprising an elastic coupling for reducing transmission of vibrations from the wheels of the motor vehicle to the chassis of the motor vehicle, the wheels being mounted on mounting means. The coupling comprises: a substantially rigid inner member for being attached to one of the chassis and the wheel mounting means, the inner member having a first end, a second end, a longitudinal axis extending from the first end to the second end, and an outer surface disposed about the inner member; a substantially rigid outer member for being attached to the other of the chassis and the wheel mounting means, the outer member for being disposed about at least a portion of the inner member, the outer member having an inner surface for being disposed a distance from the outer surface of the inner member; at least one first projection disposed adjacent each of the first and the second ends of the inner member and extending radially outwardly from the inner member a portion of the distance between the inner member and the outer member; an elastomeric device for being disposed between the inner member and the outer member to filter vibrations, the elastomeric device having a first portion and a second portion; the first portion comprising a first elastomeric portion disposed on the inner member in an area between the at least one first projection adjacent each of the first and the second ends of the inner member, the first elastomeric portion being disposed between the inner and the outer member in contact with the outer surface of the inner member and the inner surface of the outer member; at least one second projection disposed on the outer member substantially adjacent each of the at least one first projection of the inner member, the at least one second projection extending radially inwardly from the outer member a portion of the distance between the inner member and the outer member; and the second portion comprising at least one second elastomeric portion disposed between each of the at least one first projection and the adjacent at least one second projection.

Still another aspect of the invention resides broadly in an anti-vibration suspension for supporting vibration-sensitive equipment on a support, the anti-vibration suspension comprising an elastic coupling for reducing transmission of vibrations from the support to the vibration sensitive equipment. The coupling comprises: a substantially rigid inner member for being attached to one of the support and the vibration sensitive equipment, the inner member having a first end, a second end, a longitudinal axis extending from the first end to the second end, and an outer surface disposed about the inner member; a substantially rigid outer member for being attached to the other of the support and the vibration sensitive equipment, the outer member for being disposed about at least a portion of the inner member, the outer member having an inner surface for being disposed a distance from the outer surface of the inner member; at least one first projection disposed adjacent each of the first and the second of the inner member and extending radially outwardly from the inner member a portion of the distance between the inner member and the outer member; an elastomeric device for being disposed between the inner member and the outer member to filter vibrations, the elastomeric device having a first portion and a second portion; the first portion comprising a first elastomeric portion disposed on the inner member in an area between the at least one first projection adjacent each of the first and the second ends of the inner member, the first elastomeric portion being disposed between the inner and the outer member in contact with the outer surface of the inner member and the inner surface of the outer member; at least one second projection disposed on the outer member substantially adjacent each of the at least one first projection of the inner member, the at least one second projection extending radially inwardly from the outer member a portion of the distance between the inner member and the outer member; and the second portion comprising at least one second elastomeric portion disposed between each of the at least one first projection and the adjacent at least one second projection.

BRIEF DESCRIPTION OF THE DRAWINGS

The invention is explained below in greater detail, with reference to the accompanying drawings, in which:

FIG. 1 is an axial cross section of the elastic joint, which is rotationally symmetrical, according to the invention;

FIG. 3 is an axial section of the elastic joint, after molding and before finishing;

FIG. 4 shows a schematic diagram of a use for the device in a motor vehicle suspension; and FIG. 5 shows a schematic diagram of a use for the device for mounting vibration-sensitive equipment.

DESCRIPTION OF THE PREFERRED EMBODIMENTS

Figure 2A:
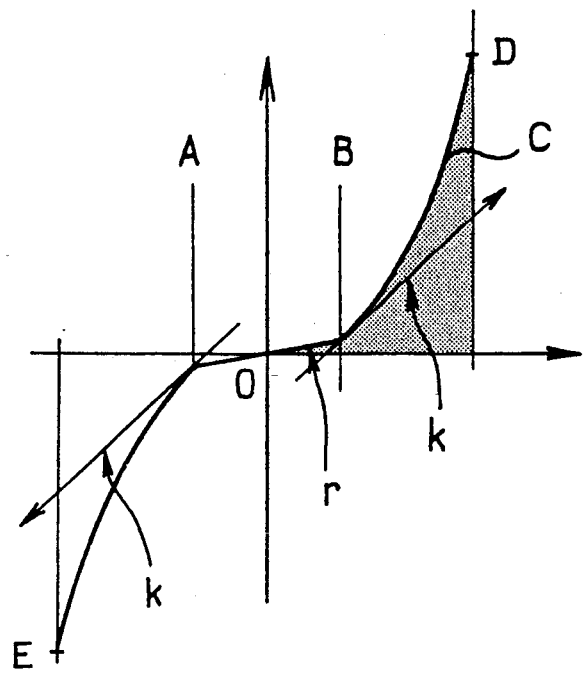
FIGS. 2a and 2b are graphs which schematically define the axial rigidity of the joint according to the present invention.

FIG. 1 is an axial section of the elastic coupling of an embodiment of the present invention, which joint is strictly rotationally symmetrical. From the outside to the inside, the joint is preferably composed of an external radially hammered ring 3, the extremities of which can be folded in to form hammered edges 8, an elastic ring 1 preferably made of an elastomer compound and an internal armature casing 2 with at least one axial shoulder 4, in the vicinity of each of its extremities. The elastic ring 1 can preferably be made of an elastomer compound intimately bonded to at least one of: the internal armature casing 2 preferably over at least a portion of the entire outside surface of the casing 2 between the axial shoulders 4 and to the internal surface of the external radially hammered ring 3. The high form factor, that is, the ratio between the surface bonded to one or the other of the rigid components and the exposed surface of the elastomer compound, makes it possible to exert major radial stresses in spite of the fact that the volume, or thickness, of the elastic ring 1 is greater than that generally used in the prior art.

The deformability of the elastic ring 1 and its modulus, which modulus can be chosen to be very low, provide the characteristics of good anti-vibration filtering. To cite one example, a joint of a rear suspension arm on an automobile can have a radial rigidity of about 300 daN per millimeter over the first few millimeters of eccentricity in any radial direction of force.

A similar joint which utilizes only the axial rigidity by simple shearing of the elastic ring 1 according to the prior art would, for example, have an axial rigidity of only about 30 daN per millimeter or less. In general, an external shoulder is frequently fitted to the external radially hammered ring 3, to thereby result in a device which can receive forces which can be up to a few hundred daN. With such a joint, there is a need to adjust, or regulate the progressive nature of the stop, which is then external, to go from one rigidity to another, with the ratio between the rigidities being more than about 10.

In other words, a similar joint that derives its axial rigidity only from the low shearing rigidity of the elastic ring 1 requires a separate mechanism to gradually increase the axial rigidity to cushion the engagement of the stop mechanism.

On the other hand, in the present invention, the confinement of the elastic ring 1 can be increased thanks to the presence of the axial shoulders 4, disposed laterally on the internal armature casing 2 and symetrically near the extremities. The casing can be made from a rigid material, such as metal, or a thermoplastic or thermosetting polymer. The height of the shoulders 4 nevertheless allows a certain conical movement of the external radially hammered ring 3 about the internal armature casing 2. Such a conical movement is made possible by the circumferential gap 5 which surrounds the axial shoulder 4, between the axial shoulder 4 and the external ring 3. The axial shoulder 4 is preferably covered with a thin layer of rubber 6 to protect the material of the shoulder 4, most often metal, against corrosion. This layer of rubber 6 can also perform an anti-noise function during a limit operation, or, in other words, during contact of the shoulder 4 with the external ring 3. This anti-noise function helps eliminate the generation of vibrations during the occasional contact of the external surface of the axial shoulder 4 with the internal surface of the external radially hammered ring 3.

This axial shoulder 4 is preferably covered, in one embodiment of the present invention, by a layer of significant thickness 7 of an elastomer compound disposed at the extremities of the internal armature casing 2. In such an embodiment, the layer 7 is preferably bonded to the shoulder 4. In another possible configuration, it may be possible to also bond the layer 7 to the edge 8 instead of the shoulder 4. The composition of this layer 7 is preferably generally identical to the composition of the elastic ring 1. FIG. 1 represents the signifi7 cantly thick layer 7 in apparent contact with the recessed edge 8 of the external radially hammered ring 3. One of the essential characteristics of the invention lies in the selection of this approximately free contact, or spacing between the layer 7 and the recessed edge 8, to make possible, without wear, relative rotational movements of the facing surfaces of the internal armature casing 2 and the external ring 3.

Radial movements must also make it possible to exert forces perpendicular to the axis. These forces can be permanent forces, or occasional, variable forces, and can be measured in hundreds of daN, and the corresponding radial movement can therefore exceed about one millimeter. A conical movement is achieved as the result of a differential offsetting between the recessed edges 8 and the significantly thick layers 7. During such conical movements, the axes of the internal armature casing 2 and of the external radially hammered ring 3 are no longer parallel.

To make such conical movements possible, another circumferential gap 9 is preferably provided to separate the inside diameter of the recessed edge 8 from the internal armature casing 2. The recessed edge 8 approaches the internal armature casing 2 at a terminal portion 10 of the internal casing 2.

On account of the use of the elastic joint, making a connection between two planes, an axial extension 11 must be left free on each extremity of the internal armature casing 2, between the inside diameter of the recessed edge 8 and the connection planes. In other words, each axial extension 11 must extend axially far enough beyond the recessed edge 8 so that the maximum axial movement of the elastic joint will not move the hammered edge 8 beyond the end of the extremity.

In the direction of the axial extension 11, the axial rigidity of the elastic ring 1 becomes apparent near the equilibrium position, i.e. the position in the absence of stresses. Any movement in an axial direction is thus accompanied by a separation of the apparent contact, at one of the extremities, between the significantly thick layer 7 and the recessed edge 8, and by a compression, at the opposite extremity, of the other significantly thick layer 7.

To adapt the functional rigidity of the elastic joint, according to the present invention, to the requirements of the end users, it is often necessary to determine the characteristic or natural rigidity of the significantly thick layers 7. This axial rigidity can essentially be determined by dynamic measurement means, over necessarily small strokes, before any major stop reactions are exerted. This characteristic is explained in more detail by the description of FIGS. 2a, 2b and 2c.

Figure 2B:
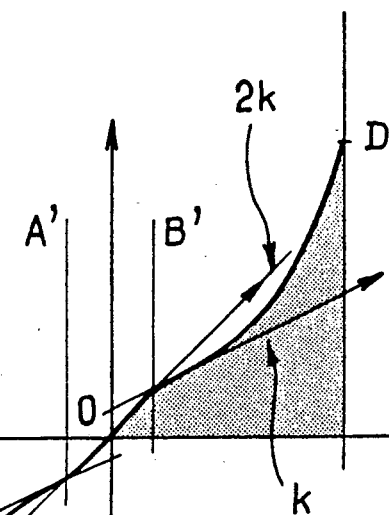
Figure 2C:
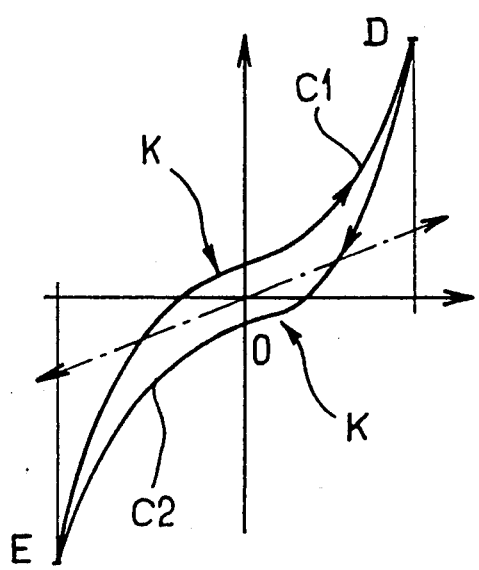
FIG. 2c is a graph which schematically defines a dynamic observation of the axial rigidity.

FIGS. 2a, 2b and 2c consist of graphs which define, with reference to one embodiment of the present invention, the axial rigidity of the elastic joint according to the invention. It is possible to thereby determine, by means of this type of measurement, the parameters of an industrial fabrication, which parameters make it possible to satisfy the requirement of the specification. In the graphs 2a-2c, movements are expressed in millimeters and are plotted on the abscissa. Axial forces exerted during the measurement of rigidity, which can occasionally exceed 300 daN, are plotted on the ordinate.

FIG. 2a shows the schematic construction of a graph where the slope of the curve (C) represents the rigidity of the elastic joint, if we assume a constant rigidity (k) during the compression of one of the significantly thick layers 7, beyond the positions represented by points (A) and (B). At the points (A) and (B), the significantly thick layer 7 comes into contact with the recessed edge 8 at one of the extremities of the elastic joint. The slope of the segment (AB) is the free axial rigidity (r) of the elastic ring. This free axial rigidity is typically very low, e.g. 30 daN/millimeter. The slope beyond the point (B) shows the initial crushing rigidity of one of the significantly thick layers 7, a rigidity which then increases gradually, beyond the tangent value (k), to achieve a high stop value, just before an impact between the material of shoulder 4 and the material of the recessed edges 8. This contact, which essentially occurs at points represented by points (D) and (E), essentially puts an end to the axial movement of the elastic joint.

It is desirable for the slope of the curve (C) to reach a high value, such as about 10 k, before reaching the position represented by point (D) of the graph. In this manner, any impact of shoulder 4 with recessed edge 8 is thereby essentially masked. In any case, the rigidity represented for the terminal portion of the curve (C) must preferably be significantly higher than the radial rigidity of the elastic joint.

In FIG. 2a, at the equilibrium point O, the point where there is no force on the elastic joint, there is also essentially no significant force on the layers 7. As an axial force is applied to the elastic joint, the internal armature casing 2 moves in an axial direction relative to the external radially hammered ring 3. Thus, near one extremity the hammered edge 8 moves away from the axial shoulder 4 and the intervening significantly thick layer 7. Since there was no significant initial force on the layer 7, and since this movement acts to relieve any force there may have been, any force on the layer 7, away from which the edge 8 is moving, does not significantly change and therefore this layer 7 does not contribute to the rigidity of the joint on this side of the equilibrium point O.

Near the other extremity the axial shoulder 4 and the layer 7 move toward the recessed edge 8. This tends to compress the layer 7. Near the equilibrium point O, or after initial contact of the layer 7 with the recessed edge 8, axial motion causes the surface of the significantly thick layer 7 adjacent to the edge 8 t slide along the edge 8 towards the internal armature casing 2. The resistance of the layer 7 to this sliding is insignificant and therefore this layer 7 essentially only contributes a small amount to the rigidity of the joint near the equilibrium point O and after initial contact of the layer 7 with the edge 8. Therefore, near the equilibrium point O the shearing rigidity of the elastic ring 1 is essentially the only component of the rigidity of the elastic joint.

The layer 7 begins to contribute to the rigidity of the elastic joint at a point when a more significant compression of the layer 7 begins to take place, for example, when the layer 7 has slid up against the internal armature casing 2. At that point, since the layer can essentially no longer slide along the edge 8, further axial movement causes the layer 7 to be compressed, and thus, the compression rigidity of the layer 7 becomes the major component of the rigidity of the elastic joint. This compression rigidity gradually increases as the compression increases, and reaches a maximum just before a theoretical contact between the shoulder 4 and the edge 8. There are several factors which can contribute to the shape of the rigidity curve of the joint, some of which factors include, an inherently non-linear rigidity of the elastomer compound, and a geometry change in the shape of the layer 7 (e.g. part of the layer 7 being squeezed out into circumferential gap 9 and the gap 5) that leaves less material in the zone under compression.

FIG. 2b represents the schematic construction of a graph which defines the axial rigidity when both stops are simultaneously acting. Thus, the two stop contacts have already essentially taken place around the symmetrical equilibrium point represented by point (O) on the graph. The rigidity in this central zone in this embodiment is thus about (2k), double the slope identifying the compression rigidity of one of the significantly thick layers 7, until the separation of one of the contacts from one of the extremities of the elastic joint, which separation can occur after an axial force of a requisite magnitude is applied to the joint.

On the graph, beyond the points (A') and (B') representing the positions of contact, the slope becomes (k) once again, or the rigidity of a single compression of one of the layers 7. In reality, the very low free axial rigidity (r) of the elastic ring is also added to these rigidities. Thus, between the points (A') and (B'), the rigidity (2 k+r) is therefore due to the existence of a permanent prestress between two contact points.

FIG. 2c is a graph depicting dynamic measurements of an elastic joint according to the invention. The force-displacement graph is opened out into two separate curves (C1) and (C2), during static measurements of the value of the friction or hysteresis and, during dynamic measurements of the viscoelasticity effect of a similar value.

The measurements of these dynamic factors always run up against the problem of the increase of the minimum slope (K), which can be detected on the rigidity curves (C1) and (C2), in the vicinity of the symmetrical equilibrium point (O), by dynamic rigidification when the amplitudes are reduced.

However, the improvement of the antivibration filtering is the way to obtain a detectable minimum slope (K) which is as low as possible over a sufficient amplitude, this amplitude being the one used to obtain a passive and effective antivibration insulation.

In the numerical example cited, this amplitude can be selected plus or minus about 0.25 millimeters around point (O). The value of (K) is then about 100 daN/millimeter for a maximum gap between stops, represented by the stroke (ED), on the order of about 3 millimeters.

On the other hand, the function performed by the elastic joint in relation to its ability to absorb axial impacts, a function measured in the same direction as the axial rigidity, contradicts this first requirement of filtering, since the shock absorbing capability is defined by the energy absorbed in a demi-oscillation, which is represented by the area between the curve and the horizontal axis. On the basis of the theoretical graph in FIG. 2a, as a function of the plot (OBD), the successive values of the rigidity are the slopes (r) and then (k), after which the value increases very sharply to about (10 k). With regard to FIG. 2b, the rigidity follows the curve (OB'D), with successive slopes of values about (2 k) then (k) then an increasing value up to about (10 k). On the actual curve illustrated in FIG. 2c, the effective operation of the part essentially makes it impossible to determine whether there physically exists a plateau (AB) corresponding to an actual gap with free axial rigidity (r) or a prestress with stroke length (A'B'), because beyond that, the apparent rigidity temporarily decreases from about (2 k) to the tangent value (k), corresponding to the compression of one of the signifi7 cantly thick layers, prestressed by the recessed edge 8, before again increasing to theoretical metal contact, or a point represented by point (D).

The rigidity curve therefore runs again, in two points, through the value (2 k) and the average curve represents an intermediate apparent rigidity, with a value (K), between (k) and (2 k).

With regard to FIG. 2a, the average curve represents an intermediate apparent rigidity (K), with a value (K) between (r) and (k), i.e. significantly less than (k).

It is likely, inasmuch as the contact of the elastomer surface of the significantly thick layer 7 with the internal metal surface of the recessed edge 8 gives a certain progressive character to the theoretical contacts represented by the points (A) and (B) (with clearance) or (A') and (B') (with prestress), that the clearance and prestress phenomena occur simultaneously, for which reason the term "controlled gap" has been selected as a characteristic of the invention.

In the zone functionally used for the antivibration filtering of the axial movements, the rigidity represented by the minimum detectable slope (K) of a graph with regard to FIG. 2c is produced practically as well at point (B) as at point (B') by the tangent value representing the rigidity (k).

The rigidity (k) is significantly different from the free axial rigidity (r) due to the pure shearing of the elastic joint, the value of which is about 30 daN/millimeter in the example cited, and by definition, it is the consequence of the deformations of one or the other of the significantly thick layers 7. It is therefore, in fact, essentially equal to the value (K).

The detectable apparent rigidity (K), which is particularly effective for the filtering, must be between two values, which are respectively about two times and about five times lower than the radial rigidity. In the numerical example cited, it can be set between about 60 and about 150 daN/millimeter, preferably at the value of 100 daN/millimeter, and thus requires that the significantly thick layer 7 have a thickness of several millimeters.

For the determination of the required thickness of the layer 7, industrial experience based on the energy likely to be absorbed in the impacts by the elastomers makes it possible to achieve recoverable energy performances without destruction of the elastomer compound if the energy does not significantly exceed about 300 Joules per kilogram of elastomer. A free stroke, before the sudden limitation of the gap by rigid contact, of more or less 1.5 millimeters, for reactions not exceeding about 750 daN, means that the energy represented by the area between the portion of the curve (OBD) or (OB'D) and the axis of the abscissa approaches about 1.2 Joules per one-half cycle.

This leads to designing the elastic joint so that a mass on the order of about 4 grams of the significantly thick layer 7 is involved in the compression. For the example cited, over an average diameter of about 25 millimeters, a thickness of the significantly thick layer 7 on the order of about 4 to 5 millimeters would be necessary to provide both a good filtering and a correct absorption of extraordinary impacts, thanks to the optimization of the stop function. The elastomers and the shapes thereof forming the elastic ring 1 and the significantly thick layer 7 with respect to rigidity, flowability, shapes thereof, including the exposed surfaces, and all dimensions thereof, including the dimensions of the internal armature casing 2, the external radially hammered ring 3 and the axial shoulder 4 can be chosen to provide desired characteristics, such as those shown in FIGS. 2a, 2b and 2c.

FIG. 3 is an axial section of the elastic joint thus defined, represented in an unfinished state before finishing by radially hammering of the external ring 3' to hammer in its edges. The preferred method of realization of one embodiment of the invention will be detailed by the description of this figure.

The cylindrical external ring 3' is obtained by cutting to length, a thin-walled tube, e.g. a tube made of drawn, unwelded steel. A circumferential gap 5' located around the axial shoulder 4 of the internal armature casing 2 must have a sufficient value to guarantee the possibility of subsequent hammering of the cylindrical external ring 3'.

The groove bottom 12 limiting the zone left open by the circumferential gap 5' must make possible the squeezing out, under the effect of this diametrical hammering, of the elastomer material having a quasi7zero volumetric compressibility.

A hammering which can amount to about 10% of the thickness over the elastic ring 1, because its thickness is significantly higher than that of the elastic joints of the prior art, can reach about 1.4 millimeters of the diameter.

The elastomer compound is then squeezed out on the two sides of the ring, a partial cross section of the elastic ring 1. The ring has an exposed surface which is only a fraction of the cross section exhibited by the elastic ring 1, because it is blocked by each axial shoulder 4.

The volume of elastomer compound thus squeezed out by the radial hammering operation can exceed three cubic centimeters for the two sides. It can be derived that the groove bottom 12 must be recessed by about 3 to 4 millimeters in relation to the axial shoulder 4 to avoid a risk of pinching the elastic material between the latter and the external radially hammered ring 3'.

It is the high form factor which gives the elastic ring 1 this restricted exposed surface, which makes it possible to produce a very effective filtering, thanks to its moderate radial rigidity during off-setting, while absorbing large radial forces. In addition, the elastic ring 1, alone, could not withstand significant axial forces, and it is the large surface area and the thickness of the layer 7 which coats the axial shoulder 4 which achieve an effective filtering as a result of the rigidity (K), as well as the resistance to the axial forces occasionally exerted.

At the same time, the thickness of the elastic ring 1 itself makes possible rotational performance without torsion which, without any additional measures, equals that of sliding rings.

To achieve the stop function with the controlled gap characteristic of the invention, the extremities of the cylindrical external ring 3', already radially hammered by means of an appropriate machine, are then placed in a suitable tool which achieves the slightly conical shape necessary for the hammered edge 8 while producing, by the intervention of a cylindrical portion of the tool confining the inward deformation, the other circumferential gap 9 (shown in FIG. 1) around the terminal portion 10. The adjustment of the surface contacts between the layers 7 and the internal surface of the edge 8, while maintaining the axial extension 11, is guaranteed to produce the desired rigidity (K).

A fabrication process for an elastic joint with a high filtering capability and a gap, which is controlled by means of incorporated stops, according to the invention, does not differ in any major aspect from the fabrication process for swivel joints according to the prior art.

At least one of the facing surfaces of the cylindrical external ring 3' and the internal armature casing 2 are preferably coated with the necessary adhesives, according to techniques of the prior art, for the intimate bonding with the material of the elastic ring 1, during the molding, by injection or by transfer, in closed molds.

The realization of the elastic ring 1 is therefore simultaneous with that of the layers 7 on the axial shoulders 4, whether the elastomer compounds are identical or different.

The next step is to produce the hammered in diameter of the cylindrical external ring 3', or the final diameter which will be used for the subsequent fitting for the assembly of the part.

The shaping of the extremities represents a third stage in the fabrication, and the final phase is protecting the surfaces against corrosion, which protection is preferably realized by means of a chemical treatment at a temperature compatible with the elastomer compound used.

The elastic joint with a high filtering capacity and a gap which is controlled by incorporated stops is then ready to be installed on the axis of rotation of a suspension arm, for example, an elastic joint for one of the articulation points of a triangular arm (or arms) in a vehicle suspension, or for the means of fastening, for anti-impact and anti-vibration protection of sensitive equipment mounted in a vehicle or on a vessel, or placed close to a source of vibrations.

The finished part can thus be installed by simple fitting of an armature into a hole, which fitting defines the positioning at the symmetrical equilibrium point (O), since the variation of the rigidity characteristic of the invention is a function of the part itself, and is not dependent on the subsequent calibration of outside stops, which thereby become unnecessary.

The advantages of the utilization of elastic joints having a high filtering capacity and a gap which is controlled by incorporated stops according to the invention are therefore:

- a significantly improved antivibration filtering without the need to adjust a functional clearance by means of independent stops;
- a good radial rigidity and efficient angular movements as the result of the use of a thick elastic ring, without having to integrate friction surfaces;
- moderate conical deformations, but with good filtering, and without exaggerated conical stiffness;
- a great ease of calibration during fabrication, and adaptability, as a result of the optimization between filtering rigidity and resistance to axial forces, without external modification of the geometry of the part; and
- the absence of an unstable zone and of external stops, thereby improving driving comfort and road-holding ability in applications to vehicle suspensions.

An elastic coupling of the present invention can be used for a variety of situations in which one component needs to be at least partially isolated from vibrations which occure in a second component, such as reducing vibrations transmitted to a chassis of a motor vehicle from the wheel suspension of the motor vehicle as shown in FIG. 4. Various wheel suspensions for motor vehicles are disclosed in U.S. Pat. Nos. 5,083,812 to Wallace and Pierce, entitled "Suspension with Stiffener Arm"; No. 4,951,791 to Belil, entitled "Rear Wheel Suspension Mechanism for Motorcycles and the Like Vehicles"; No. 4,911,467 to Alesso and Perello, entitled "Rear Suspension for Motor Vehicles, of the type with Independent Wheels and Longitudinal Arms"; and No. 4,611,681 to Krude and Hazebrook, entitled "Independent Wheel Suspension System Using Thrust Bearing Constant Velocity Universal Drive Joints as Suspension Members".

Other types of uses for such a coupling would be for reducing transmission of vibrations from a chassis of a motor vehicle, or body of any operating machinery, to vibration sensitive equipment that must be mounted on the chassis, or body, of the machinery. Some types of equipment which may need to be isolated include sensitive electronic monitoring devices for monitoring functions of the motor vehicle or operating machinery. The coupling could therefore find usage in a device such as that of U.S. Pat. No. 4,998,636 to Hardigg, entitled "Electronic Rack and Mounting Frame"; or as a mount for the device as disclosed in U.S. Pat. No. 4,404,459 to Harton, entitled "Housing and Mounting Assembly Providing a Temperature Stabilized Environment for a Microcircuit".

One feature of the invention resides broadly in an elastic joint with high filtering capability and a gap which is controlled by incorporated stops, using the elastic bonding of an elastomer compound intimately bonded to two coaxial rigid elements to make possible the frictionless rotation of a suspension arm around a fixed axis, characterized by the fact that a significantly thick layer 7 of elastomer compound covering the axial shoulders 4 of each extremity of an internal armature casing 2 is in axial contact, in each direction, against the hammered edge 8 of an external radially hammered ring 3 which swivels, by deformation of an elastic ring 1, on the internal armature casing 2, by the fact that the stop function, in each axial direction, is optimized to obtain, in the event of dynamic movements without permanent axial stresses, a filtering rigidity which is from two to five times lower than the rigidity opposing the radial forces, and by the fact that the axial rigidity, beyond the filtering zone, gradually becomes greater than the value of the rigidity opposing radial forces.

Another feature of the invention resides broadly in a vehicle suspension utilizing one or more triangular arms articulated around an axis which is fixed in relation to the chassis, characterized by the fact that at least one of the articulation points is equipped with an elastic joint with a high filtering capacity and axial gap controlled by incorporated stops.

Yet another feature of the invention resides broadly in a fastening for use of anti-vibration suspension on equipment mounted in a vehicle or on a vessel, characterized by the fact that it is equipped with at least one elastic joint having a high filtering capacity and axial gap controlled by incorporated stops.

All, or substantially all, of the components and methods of the various embodiments may be used with at least one embodiment or all of the embodiments, if any, described herein.

All of the patents, patent applications and publications recited herein, if any, are hereby incorporated by reference for non-essential subject matter, in accordance with defined practice, as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An elastic coupling for joining together and filtering vibrations between a first component and a second component, said coupling comprising:
   a substantially rigid inner member for being attached to one of said first and said second components, said inner member having a first end, a second end, a longitudinal axis extending from said first end to said second end, and an outer surface disposed about said inner member;
   a substantially rigid outer member for being attached to the other of said first and second components, said outer member for being disposed about at least a portion of said inner member, said outer member having an inner surface for being disposed a distance from said outer surface of said inner member;
   said inner member comprising a first projection and a second projection, said second projection being spaced apart from said first projection, and each of said first projection and said second projection extending radially outwardly from said inner member a portion of the distance between said inner member and said outer member;
   elastomeric means for being disposed between said inner member and said outer member to filter vibrations, said elastomeric means having a first portion means and a second portion means;
   said first portion means comprising a first elastomeric portion disposed on said inner member at least in an area between said first projection and said second projection, said first elastomeric portion being disposed between said inner and said outer member in contact with the outer surface of the inner member and the inner surface of the outer member;
   each of said first projection and said second projection of said inner member having a first side disposed adjacent said first portion means and a second side disposed towards an end of said inner member;
   said outer member has a first end and a second end, the second end being disposed opposite to the first end;
   said first and second ends of said outer member extending radially inwardly towards said inner member a portion of the distance between said inner member and said outer member to form a first projection and a second projection of said outer member;
   said first projection of said outer member being disposed substantially adjacent said second side of said first projection of said inner member, said second projection of said outer member being disposed substantially adjacent said second side of said second projection of said inner member; and
   said second portion means comprising at least one second elastomeric portion disposed between each of:
     said first projection of said inner member and said first projection of said outer member, and
     said second projection of said inner member and said second projection of said outer member.

2. The coupling according to claim 1, wherein:
   said at least one second elastomeric portion is prestressed between said adjacent ones of:
     said first projection of said inner member and said first projection of said outer member, and
     said second projection of said inner member and said second projection of said outer member; and
   said radially inwardly extending first and second ends of said outer member having been turned radially inwardly in place about said inner member to compress and prestress said at least one second elastomeric portion disposed about said inner member.

3. The coupling according to claim 2, wherein:
   said inner member with said first and second projections of said inner member comprise a single uni7 tary part of one homogeneous material; and
   said outer member with said first and second projections of said outer member comprise a single unitary part of one homogeneous material.

4. The coupling according to claim 3, wherein:
   said radially inwardly extending first and second ends of said outer member having been turned radially inwardly in place about said inner member to compress and prestress said at least one second elastomeric portion disposed about said inner member comprises said radially inwardly extending first and second ends of said outer member having been hammered radially inwardly in place about said inner member;
   said coupling has a central portion between said first and said second projections of said inner member;
   each of said first and second projections of said inner member are disposed a second distance from said central portion and each of said first and second projections of said outer member are disposed a third distance from said central portion; and
   the third distance from said central portion to each of said first and second projections of said outer member is greater than the second distance from said central portion to each of said first and second projections of said inner member.

5. The coupling according to claim 4, wherein:
   said coupling has an axial rigidity and a radial rigidity;
   said coupling has a rest configuration;
   said first and said at least one second elastomeric portions are configured such that said radial rigidity is about two to about five times greater than said axial rigidity at least in said rest configuration;
   one of said inner member and said outer member is movable from said rest configuration in an axial direction with respect to the other of said inner member and said outer member; and
   said first and said at least one second elastomeric portions being configured such that said axial rigidity increases with respect to said radial rigidity to an amount greater than said radial rigidity upon moving one of said inner member and said outer member from said rest configuration in an axial direction with respect to the other of said inner member and said outer member.

6. The coupling according to claim 5, wherein:
said first elastomeric portion is intimately bonded to each of said inner member and said outer member;
said at least one second elastomeric portion comprising two second elastomeric portions;
one of said two second elastomeric portions is intimately bonded to one of:
  said first projection of said inner member; and
  said first projection of said outer member; and
the other of said two second elastomeric portions is intimately bonded to one of:
  said second projection of said inner member; and
  said second projection of said outer member.

7. The coupling according to claim 6, wherein:
said two second elastomeric portions comprise a first of said two second elastomeric portions disposed between said first projection of said inner member and said first projection of said outer member and a second of said two second elastomeric portions disposed between said second projection of said inner member and said second projection of said outer member;
said first of said two second elastomeric portions has:
  a first surface disposed adjacent and intimately bonded to said first projection of said inner member, and
  a second surface disposed adjacent said first projection of said outer member, said second surface being configured to be slidable on said first projection of said outer member; and said second of said two second elastomeric portions has:
  a first surface disposed adjacent and intimately bonded to said second projection of said inner member, and
  a second surface disposed adjacent said second projection of said outer member, said second surface being configured to be slidable on said second projection of said outer member.

8. The coupling according to claim 7, wherein:
said first and second projections of said inner member are spaced a fourth distance apart from said outer member and define a first gap extending from said outer member to said first and second projections of said inner member;
said first and second projections of said outer member are spaced a fifth distance apart from said inner member and define a second gap extending from said inner member to said first and second projections of said outer member; and
each of said first gap and said second gap is configured to allow radial deflections of one of said inner member and said outer member with respect to the other of said inner member and said outer member.

9. The coupling according to claim 8, wherein:
said second elastomeric portions are for being compressed during an axial movement of one of said inner member and said outer member with respect to the other of said inner member and said outer member;
said second elastomeric portions being deformed upon being compressed; and
each of said first and said second gaps being configured to receive at least a portion of said second elastomeric compound upon said deformation of the second elastomeric compound by compression between said first and said second projections during an axial movement of one of said inner member and said outer member with respect to the other of said inner member and said outer member.

10. The coupling according to claim 7, wherein:
one of said inner member and said outer member is movable axially with respect to the other of said inner member and said outer member a maximum axial distance, said maximum axial distance being substantially a difference between said second distance and said third distance;
said inner member has an extremity portion disposed at each of said first and said second ends of said inner member;
said extremity portion extends a distance from said central portion;
said distance from said central portion to said extremity portion is greater than said distance from said central portion to each of said first and second projections of said outer member by at least said maximum axial distance;
said outer member comprises a tubular member disposed around said inner member;
said first and second projections of said inner member comprise circumferential projections disposed about said inner member;
said first and second projections of said inner member comprise a circumferential surface disposed towards said outer member, said circumferential surface comprising a coating of elastomeric material thereon for providing corrosion protection and reducing contact noise between said first and second projections of said inner member and said outer member, said first and second projections of said inner member comprising stop means for limiting radial movement of said inner member within said outer member upon contact of said first and second projections of said inner member with said outer member;
said first gap comprises a circumferential gap disposed about said first and second projections of said inner member;
said second gap comprises a circumferential gap disposed about said inner member;
said inner member comprises one of: metal, thermoplastic, and thermosetting polymer;
said inner member comprises an internal surface defining said longitudinal bore;
said outer member comprises an external surface disposed externally away from said inner member;
at least one of said extremity portions, said internal surface of said inner member of said external surface of said outer member comprising a chemical corrosion treatment thereon;
said outer member defines a diameter of said coupling, said diameter being about 25 mm;
said elastomeric means has a thickness defined between said inner and said outer member, said thickness being about 4 to about 5 mm;
said coupling has an axial direction with an axial filtering rigidity; and
said coupling has a radial direction with a radial rigidity.

11. An elastic coupling for joining together and filtering vibrations between a first component and a second component, said coupling comprising:
a substantially rigid inner member for being attached to one of said first and said second components, said inner member having a first end, a second end, a longitudinal axis extending from said first end to said second end, and an outer surface disposed about said inner member;

a substantially rigid outer member for being attached to the other of said first and said second components, said outer member for being disposed about at least a portion of said inner member, said outer member having an inner surface for being disposed a distance from said outer surface of said inner member;

said inner member comprising a first projection disposed at said first end of said inner member, and a second projection disposed at said second end of said inner member, each of said first and said second projections of said inner member extending radially outwardly from said inner member a portion of the distance between said inner member and said outer member;

elastomeric means for being disposed between said inner member and said outer member to filter vibrations, said elastomeric means having a first portion means and a second portion means;

said first portion means comprising a first elastomeric portion disposed on said inner member in an area between said first projection and said second projection of said inner member, said first elastomeric portion being disposed between said inner member and said outer member in contact with the outer surface of the inner member and the inner surface of the outer member;

said outer member comprises:
 a first projection disposed adjacent said first end of said outer member and substantially adjacent said first projection of said inner member, and
 a second projection disposed adjacent said second end of said outer member and substantially adjacent said second projection of said inner member;

said first and second projections of said outer member extending radially inwardly from said outer member a portion of the distance between said inner member and said outer member;

said second portion means comprising at least one second elastomeric portion disposed between said adjacent ones of:
 said first projection of said inner member and said first projection of said outer member, and
 said second projection of said inner member and said second projection of said outer member;

said coupling having a rest configuration; and said at least one second elastomeric portion is compressed and pre-stressed between said adjacent ones of:
 said first projection of said inner member and said first projection of said outer member, and
 said second projection of said inner member and said second projection of said outer member, to provide said rest configuration of said coupling.

12. The coupling according to claim 11, wherein:
said first projection and said second projection of said inner member are the sole projections of said inner member;

said first projection of said second projection of said outer member are the sole projections of said outer member;

said coupling has an axial rigidity and a radial rigidity;

said first and said second elastomeric portions are configured such that said radial rigidity is about two to about five times greater than said axial rigidity at least in said rest configuration;

one of said inner member and said outer member is movable from said rest configuration in an axial direction with respect to the other of said inner member and said outer member; and said first and said second elastomeric portions being configured such that said axial rigidity increases with respect to said radial rigidity to an amount greater than said radial rigidity upon moving one of said inner member and said outer member from said rest configuration in an axial direction with respect to the other of said inner member and said outer member.

13. The coupling according to claim 12, wherein:
said second portion means comprises two second elastomeric portions, a first of said second elastomeric portions being disposed between said first projection of said inner member and said first projection of said outer member, and a second of said two second elastomeric portions being disposed between said second projection of said inner member and said second projection of said outer member;

said first elastomeric portion is intimately bonded to each of said inner member and said outer member;

said first of said two second elastomeric portions has:
 a first surface disposed adjacent and intimately bonded to said first projection of said inner member, and
 a second surface disposed adjacent said first projection of said outer member, said second surface being configured to be slidable on said first projection of said outer member; and said second of said two elastomeric portions has:
 a first surface disposed adjacent and intimately bonded to said second projection of said inner member, and
 a second surface disposed adjacent said second projection of said outer member, said second surface being configured to be slidable on said second projection of said outer member.

14. The coupling according to claim 13, wherein:
said coupling has a central portion between said first and said second projections of said inner member;

each of said first and second projections of said inner member are disposed a second distance from said central portion, and each of said first and second projections of said outer member are disposed a third distance from said central portion;

the third distance from said central portion to each of said first and second projections of said outer member is greater than the second distance from said central portion to each of said first and second projections of said inner member;

said outer member comprises a tubular member disposed around said inner member, said tubular member having a first end and a second end;

said first end and said second end of said tubular member are deformed radially inwardly to form said first and second projections of said outer member and prestress said second elastomeric portions;

said inner member with said first and second projections of said inner member comprise a single unitary part of one homogeneous material; and said outer member with said first and second projections of said outer member comprise a single unitary part of one homogeneous material.

15. The coupling according to claim 14, wherein:

each of said first and second projections of said inner member are spaced a fourth distance apart from said outer member and define a first gap extending from said outer member to each of said first and second projections of said inner member, said first gap comprising a circumferential gap disposed about said first and second projections of said inner member;

each of said first and second projections of said outer member are spaced a fifth distance apart from said inner member and define a second gap extending from said inner member to each of said first and second projections of said outer member, said second gap comprising a circumferential gap disposed about said inner member;

each of said first gap and said second gap is configured to allow radial deflections of one of said inner member and said outer member with respect to the other of said inner member and said outer member;

said first and second projections of said inner member comprise a circumferential surface disposed towards said outer member, said circumferential surface comprising a coating of elastomeric material thereon for providing corrosion protection and reducing contact noise between said first and second projections of said inner member with said outer member;

said first and second projections of said inner member comprising stop means for limiting said radial deflections of said inner member within said outer member upon contact of said first and second projections of said inner member with said outer member;

said second elastomeric portions are for being compressed during an axial movement of one of said inner member and said outer member with respect to the other of said inner member and said outer member; said second elastomeric portions being deformed upon being compressed;

each of said first and said second gaps being configured to receive at least a portion of said second elastomeric portions upon said deformation of the second elastomeric portions by compression between said first and said second projections during an axial movement of one of said inner member and said outer member with respect to the other of said inner member and said outer member;

one of said inner member and said outer member is movable axially with respect to the other of said inner member and said outer member a maximum axial distance, said maximum axial distance being substantially a difference between said second distance and said third distance;

said inner member has an extremity portion disposed at each of said first and said second ends of said inner member;

said extremity portion extends a sixth distance from said central portion;

said sixth distance from said central portion to said extremity portion is greater than said third distance from said central portion to each of said second projection by at least said maximum axial distance;

said inner member comprises one of: metal, thermoplastic, and thermosetting polymer;

said first end and said second end of said outer tubular member are radially hammered inwardly;

said inner member comprises an internal surface defining said longitudinal bore;

said outer member comprises an external surface disposed externally away from said inner member;

at least one of said extremity portions, said internal surface of said inner member and said external surface of said outer member comprising a chemical corrosion treatment thereon;

said outer member defined a diameter of said coupling, said diameter being about 25 mm;

said elastomeric means has a thickness defined between said inner and said outer member, said thickness being about 4 to about 5 mm;

said coupling has an axial direction with an axial filtering rigidity; and said coupling has a radial direction with a radial rigidity.

16. An elastic coupling for joining together and filtering vibrations between a first component and a second component, said coupling comprising:

a substantially rigid inner member for being attached to one of said first and said second components, said inner member having a first end, a second end, a longitudinal axis extending from said first end to said second end, and an outer surface disposed about said inner member;

a substantially rigid outer member for being attached to the other of said first and said second components, said outer member for being disposed about at least a portion of said inner member, said outer member having an inner surface for being disposed a distance from said outer surface of said inner member;

said inner member comprising a first projection disposed adjacent said first end of said inner member, and a second projection disposed adjacent said second end of said inner member, said first and second projections of said inner member extending radially outwardly from said inner member a portion of the distance between said inner member and said outer member;

elastomeric means for being disposed between said inner member and said outer member to filter vibrations, said elastomeric means having a first portion means and a second portion means;

said first portion means comprising a first elastomeric portion disposed on said inner member between said first and second projections of said inner member, said first elastomeric portion being disposed between said inner and said outer member in contact with the outer surface of the inner member and the inner surface of the outer member;

said outer member comprising a first projection disposed substantially adjacent said first projection of said inner member, and a second projection disposed substantially adjacent said second projection of said inner member, said first and second projections of said outer member extending radially inwardly from said outer member a portion of the distance between said inner member and said outer member; and said second portion means comprising at least one second elastomeric portion disposed between each of:

said first projection of said inner member and said first projection of said outer member; and said second projection of said inner member and said second projection of said outer member;

said first and second projections of said inner member are spaced a second distance from said outer member and define a first gap extending from said outer member to each of said first and second projections of said inner member;

said first and second projections of said outer member are spaced a third distance from said inner member and define a second gap extending from said inner member to each of said first and second projections of said outer member;

each of said first gap and said second gap being configured to allow radial deflections of one of said inner member and said outer member with respect to the other of said inner member and said outer member; and said first and second projections of said inner member each have a portion extending away from said inner member, said extending portions comprise stop means for contacting said outer member to limit radial movement of said inner member within said outer member.

17. The coupling according to claim 16, wherein:

said coupling has a central portion between said first and said second projections of said inner member;

each of said first and second projections of said inner member are disposed a fourth distance from said central portion, and each of said first and second projections of said outer member are disposed a fifth distance from said central portion;

the fifth distance from said central portion to each of said first and second projections of said outer member is greater than the fourth distance from said central portion to each of said first and second projections of said inner member;

said outer member comprises a tubular member disposed around said inner member, said tubular member having a first end and a second end; and said first end and said second end of said tubular member having been deformed radially inwardly to form said first and second projections of said outer member.

18. The coupling according to claim 17, wherein:

said second elastomeric portions are pre-stressed between said adjacent ones of:
  said first projection of said inner member and said first projection of said outer member, and
  said second projection of said inner member and said second projection of said outer member;

said radially inwardly extending first and second ends of said outer member having been hammered radially inwardly in place about said inner member to compress and prestress said second elastomeric portions disposed about said inner member;

said inner member with said first and second projections of said inner member comprise a single unitary part of one homogeneous material; and said outer member with said first and second projections of said outer member comprise a single unitary part of one homogeneous material.

19. The coupling according to claim 18, wherein:

said coupling has an axial rigidity and a radial rigidity;

said coupling has a rest configuration;

said first and said second elastomeric portions being configured such that said radial rigidity is about two to about five times greater than said axial rigidity at least in said rest configuration;

said first and said second elastomeric portions being configured such that said axial rigidity increases with respect to said radial rigidity to an amount greater than said radial rigidity upon moving one of said inner member and said outer member from said rest configuration in an axial direction with respect to the other of said inner member and said outer member.

20. The coupling according to claim 19, wherein:

said inner member comprises solely two projections, said two projections of said inner member comprising said first projection and said second projection of said inner member;

said outer member comprises solely two projection, said two projections of said outer member comprising said first projection and said second projection of said outer member;

one of said inner member and said outer member is movable from said rest configuration in an axial direction with respect to the other of said inner member and said outer member;

said second elastomeric portions are for being compressed during said axial movement of one of said inner member and said outer member with respect to the other of said inner member and said outer member;

said second elastomeric portions being deformed upon being compressed;

each of said first and said second gaps being configured to receive at least a portion of said second elastomeric portions upon said deformation of the second elastomeric portions by compression between said first and said second projections during an axial movement of one of said inner member and said outer member with respect to the other of said inner member and said outer member;

said second portion means comprises two second elastomeric portions, a first of said second elastomeric portions being disposed between said first projection of said inner member and said first projection of said outer member, and a second of said two second elastomeric portions being disposed between said second projection of said inner member and said second projection of said outer member;

said first elastomeric portion is intimately bonded to each of said inner member and said outer member;

said first of said two second elastomeric portions has:
  a first surface disposed adjacent and intimately bonded to said first projection of said inner member, and
  a second surface disposed adjacent said first projection of said outer member, said second surface being configured to be slidable on said first projection of said outer member; said second of said two elastomeric portions has:
  a first surface disposed adjacent and intimately bonded to said second projection of said inner member, and
  a second surface disposed adjacent said second projection of said outer member, said second surface being configured to be slidable on said second projection of said outer member;

one of said inner member and said outer member is movable axially with respect to the other of said inner member and said outer member a maximum axial distance, said maximum axial distance being substantially a difference between said fourth distance and said fifth distance;

said inner member has an extremity portion disposed at each of said first and said second ends of said inner member;

said extremity portion extends a sixth distance from said central portion; and said sixth distance from said central portion to said extremity portion is greater than said fifth distance from said central portion to each of said second projections by at least said maximum axial distance;

said inner member comprises one of: metal, thermoplastic, and thermosetting polymer;

said inner member comprises an internal surface defining said longitudinal bore;

said outer member comprises an external surface disposed externally away from said inner member;

said extremity portions, said internal surface of said inner member and said external surface of said outer member comprising a chemical corrosion treatment thereon;

said outer member defines a diameter of said coupling, said diameter being about 25 mm;

said elastomeric means has a thickness defined between said inner and said outer member, said thickness being about 4 to about 5 mm;

said coupling has an axial direction with an axial filtering rigidity; and said coupling has a radial direction with a radial rigidity.

* * * * *

UNITED STATES PATENT AND TRADEMARK OFFICE
CERTIFICATE OF CORRECTION

PATENT NO. : 5,288,059
DATED : February 22, 1994
INVENTOR(S) : Michel GAUTHERON and Thierry DUCHENE It is certified that error appears in the above-indentified patent and that said Letters Patent is hereby corrected as shown below:

In column 1, lines 39-40, after 'which', delete "extremi7ties" and insert --extremities--.

In column 1, line 61, after 'to', delete "Hutch" and insert --Hutchinson--.

In column 4, line 27, after 'second' insert --ends--.

In column 6, lines 12-13, after the second occurrence of 'the', delete "signifi7cantly" and insert --significantly--.

In column 7, lines 19-20, after the second occurrence of 'the', delete "signifi7cantly" and insert --significantly--.

In column 7, lines 46-47, after 'not', delete "signifi7cantly" and insert --significantly--.

In column 7, line 55, after '8', delete "t" and insert --to--.

In column 8, lines 25-26, after 'requisite', delete "magni7tude" and insert --magnitude--.

In column 9, line 11, after the second occurrence of 'the', delete "signifi7cantly" and insert --significantly--.

In column 10, line 31, after 'a', delete "quasi7zero" and insert --quasi-zero--.

UNITED STATES PATENT AND TRADEMARK OFFICE
CERTIFICATE OF CORRECTION

PATENT NO. : 5,288,059
DATED : February 22, 1994
INVENTOR(S) : Michel GAUTHERON and Thierry DUCHENE It is certified that error appears in the above-indentified patent and that said Letters Patent is hereby corrected as shown below:

In column 11, lines 13-14, after 'the', delete "fabri7cation" and insert --fabrication--.

In column 14, lines 24-25, Claim 3, after 'single', delete "uni7tary" and insert --unitary--.

In column 15, lines 8-9, Claim 6, after 'is', delete "inti7mately" and insert --intimately--.

In column 16, line 4, Claim 10, after 'claim', delete "7" and insert --9--.

In column 16, line 51, Claim 10, after 'member', delete "of" and insert --and--.

In column 20, line 11, Claim 15, after 'member', delete "defined" and insert --defines--.

In column 22, line 16, Claim 20, after 'two', delete "projection," and insert --projections,--.

Signed and Sealed this

Twenty-fourth Day of December, 1996

Attest:

BRUCE LEHMAN

Attesting Officer     Commissioner of Patents and Trademarks